Patented Dec. 19, 1933

1,940,557

UNITED STATES PATENT OFFICE 1,940,557

MANUFACTURE OF CALCIUM HYPOCHLORITE

Joseph Arthur Musgrave Woodcock Mitchell, Runcorn, and Francis Thomas Meehan, Liverpool, England, assignors to Imperial Chemical Industries Limited, a corporation of Great Britain No Drawing. Application December 2, 1931, Serial No. 578,612, and in Great Britain December 3, 1930

7 Claims. (Cl. 23—86)

This invention relates to the manufacture of calcium hypochlorite products which are free, or substantially free, from calcium chloride. As is well known, the presence of calcium chloride in calcium hypochlorite products leads to difficulties in drying and also tends to make the product unstable.

It has already been proposed to eliminate calcium chloride from calcium hypochlorite products by treating the same with an alkali metal hypochlorite in equivalent amount to the calcium chloride present, but this process requires the troublesome preparation of alkali hypochlorite. It has also been proposed to eliminate calcium chloride liquor adhering to crystals of calcium hypochlorite by treating the same without any fresh addition of water with an amount corresponding to the calcium chloride present, of finely divided alkali metal salts of acids whose calcium salts are sparingly soluble or insoluble. This process suffers from the drawback that the final product contains appreciable quantities of insoluble matter in addition to alkali metal chloride.

We have now found that it is possible to obtain calcium hypochlorite products which are almost completely soluble in water and which contain 70 per cent. or more of calcium hypochlorite, the balance being essentially alkali metal chloride, by treating an aqueous solution of calcium hypochlorite containing calcium chloride, with an alkali metal salt of an acid which forms a sparingly soluble or insoluble calcium salt, the precipitate of insoluble calcium salt being removed and the solution treated for the isolation of a product consisting of calcium hypochlorite crystals with or without crystals of alkali metal chloride. According to the invention, therefore, a process for the production of calcium hypochlorite products free or substantially free from calcium chloride and completely or practically completely soluble in water, includes the steps of treating an aqueous solution containing calcium hypochlorite and calcium chloride, with an alkali metal salt of an acid which forms an insoluble or sparingly soluble calcium salt, removing the resulting precipitate of calcium salt, and treating the residual solution, preferably by evaporation under reduced pressure at a temperature not exceeding 60° C., for the isolation of a product consisting of calcium hypochlorite crystals with or without crystals of alkali metal chloride. Thus a solution containing calcium hypochlorite and calcium chloride, prepared for example by chlorinating milk of lime, may be treated with an amount of sodium carbonate which is chemically equivalent to the calcium chloride present. The resulting precipitate of calcium carbonate is then separated by filtration or settling, and the clear liquor is subjected to a careful evaporation process, as a result of which crystals of calcium hypochlorite are deposited until the mother liquor reaches a certain composition, e. g. so as to contain approximately 9.5 per cent. of available chlorine and approximately 11.5 per cent. of chlorine in the form of chloride. Further evaporation will cause no essential change in the composition of the mother liquor and the crystals deposited will consist, not of calcium hypochlorite alone, but of a mixture of crystals of calcium hypochlorite and sodium chloride. This mixture will contain available chlorine and chloride chlorine in the same ratio as the liquor, that is approximately as five is to six. It is however to be pointed out that the precise composition of this final liquor will vary slightly with the temperature and also to a small extent if there is decomposition of the hypochlorite during the evaporation. The calcium hypochlorite crystals are separated from the mother liquor as completely as possible, e. g. by centrifuging or pressing, and are then carefully dried by means of a current of hot air or under vacuum or by other suitable means. The resulting product consists mainly of calcium hypochlorite the balance being sodium chloride, derived from adherent mother liquor and a small amount of lime, and is substantially free from the undesirable calcium chloride and almost completely soluble in water.

The residual mother liquor after removal of the calcium hypochlorite crystals may be evaporated to dryness to yield a lower grade product containing about 30 per cent. of available chlorine. This product may be used in place of bleaching powder made by ordinary methods, and has the advantage that it is almost completely soluble in water.

The invention is not limited to the treatment of solutions containing chemically equivalent amounts of calcium hypochlorite and chloride such as are obtained by the chlorination of milk of lime containing only so much lime that the whole of the hypochlorite remains in solution. It may with advantage be applied to a suspension containing solid calcium hypochlorite obtained by the practically complete chlorination of milk of lime of such strength that crystals of normal calcium hypochlorite are deposited.

These crystals are separated from the mother liquor, e. g. by filtering or centrifuging, and the sludge or cake so obtained treated with water and the requisite amount of the alkali metal salt such as sodium carbonate and the insoluble calcium salt removed. In this case sufficient water must be added to ensure complete solution of the normal calcium hypochlorite otherwise loss of available chlorine will occur as solid hypochlorite when the insoluble calcium salt is removed from the liquor. The solution, after removal of the insoluble calcium salt is evaporated as previously described to obtain a high strength product and a product containing about 30% available chlorine, or if desired, the solution may be evaporated in one stage only to give a high strength product the available chlorine content of which will depend on the ratio of available chlorine to chloride chlorine in the sludge.

In the treatment of sludges or cakes containing solid calcium hypochlorite it may be found advantageous to add to the sludge sufficient water to dissolve the hypochlorite and to remove lime and other insoluble matter before adding the alkali metal salt.

Although we have previously specifically referred only to sodium salts in the description of our invention, potassium and other alkali metal salts of acids which form insoluble salts with calcium are also applicable. In such cases, however, the point at which the evaporation must be stopped in order to avoid the deposition of crystals containing chloride chlorine may be different. For example, if a potassium salt is being used the evaporation must be stopped when the available chlorine and chloride chlorine in the liquor are approximately 14% and 8.25% respectively.

In addition to the process being applicable to the treatment of solutions directly produced by chlorination of milk of lime we may also apply it to solutions containing calcium hypochlorite and calcium chloride which have been produced by the decomposition of basic hypochlorites by means of water.

The invention is illustrated, but not limited, by the following examples, in which the parts are by weight.

*Example 1*

To 100 lbs. of liquor containing calcium hypochlorite equivalent to 8.5% available chlorine and 8.7% calcium chloride was added a solution containing 8.3 lbs. of sodium carbonate dissolved in 24 lbs. water. The insoluble calcium carbonate was settled out and a liquor obtained containing 6.8% available chlorine and 4.4% chloride chlorine. 100 lbs. of this liquor were evaporated under reduced pressure and at a temperature of about 50° C. to give a sludge of crystals and liquor. On centrifuging, 33 lbs. of liquor containing 9.1% available chlorine and 11.7% chloride chlorine and 7.2 lbs. of cake were obtained. On drying, the solid yielded 4.7 lbs. of product containing 71% available chlorine and 24% sodium chloride.

*Example 2*

A cake obtained by centrifuging normal calcium hypochlorite crystals produced by the chlorination of milk of lime was treated with water to give 95.4 lbs. of solution containing 13.9% calcium hypochlorite and 2.6% calcium chloride. This solution was treated with 2.4 lbs. sodium carbonate dissolved in 16 lbs. of water and the resulting precipitate of calcium carbonate removed. 100 lbs. of the clear solution were evaporated as in Example 1 to give a mixture of crystals and liquor. On centrifuging 15.1 lbs. of cake and 19.1 lbs. of liquor were obtained. On drying the solid under vacuum in a steam jacketed dryer 10 lbs. of product containing 89.3% available chlorine were obtained. In this example the concentration of the liquor was not carried sufficiently far to attain a constant composition.

*Example 3*

To 100 lbs. of liquor obtained in the same way as the initial liquor in Example 2 and containing 13.8% available chlorine and 2.2% calcium chloride was added a solution of 2.84 lbs. sodium sulphate in 28 lbs. water. 120 lbs. of the clear liquor after removal of the precipitated calcium sulphate, were evaporated and yielded 28 lbs. of moist crystals from which 14.5 lbs. of product containing 82.7% available chlorine were obtained by drying.

As many apparently widely different embodiments of this invention may be made without departing from the spirit and scope thereof, it is to be understood that we do not limit ourselves to the specific embodiments thereof except as defined in the appended claims.

We claim:

1. The manufacture of calcium hypochlorite products substantially free from calcium chloride and practically completely soluble in water, which includes the steps of chlorinating milk of lime of such strength that crystals of normal calcium hypochlorite are deposited, separating the solids from the mother liquor, treating the said solids with sufficient water to dissolve the normal calcium hypochlorite, treating the resulting liquor containing calcium hypochlorite and calcium chloride with sufficient of an alkali metal salt of an acid the calcium salt of which is sparingly soluble, to precipitate the calcium chloride initially present in the said liquor, removing the resulting precipitate of calcium salt and other solids, and evaporating the residual solution to isolate a solid calcium hypochlorite product.

2. The manufacture of calcium hypochlorite products substantially free from calcium chloride and practically completely soluble in water, which includes the steps of chlorinating milk of lime of such strength that crystals of normal calcium hypochlorite are deposited, separating the solids from the mother liquor, treating the said solids with sufficient water to dissolve the normal calcium hypochlorite, removing lime and other insoluble matter from the resulting liquor, treating the resulting solution with sufficient of an alkali metal salt of an acid the calcium salt of which is sparingly soluble, to precipitate the calcium chloride initially present in the said solution, removing the resulting precipitate of calcium salt, and evaporating the residual solution to isolate a solid calcium hypochlorite product.

3. The process of eliminating calcium chloride from a mixture of calcium hypochlorite and calcium chloride, which comprises treating the said mixture in aqueous solution with sufficient of an alkali metal salt of an acid the calcium salt of which is sparingly soluble, to precipitate an amount of calcium equivalent to the chloride ion originally present in the said mixture, and separating the precipitate from the solution.

4. The manufacture of calcium hypochlorite products substantially free from calcium chloride which includes the steps of treating a solution containing calcium hypochlorite and calcium chloride with an alkali metal salt of an acid, the calcium salt of which is sparingly soluble, in an amount chemically equivalent to the chloride present and evaporating the solution to isolate solid calcium hypochlorite.

5. The manufacture of calcium hypochlorite products substantially free from calcium chloride which includes the steps of treating a solution containing calcium hypochlorite and calcium chloride with an alkali metal salt of an acid, the calcium salt of which is sparingly soluble, in an amount chemically equivalent to the chloride present, removing the precipitated calcium salt and evaporating the solution to isolate solid calcium hypochlorite.

6. The manufacture of calcium hypochlorite products substantially free from calcium chloride which includes the steps of treating a solution containing calcium hypochlorite and calcium chloride with sodium carbonate in an amount chemically equivalent to the chloride present, removing the precipitated calcium carbonate, evaporating the solution to isolate solid calcium hypochlorite and drying said solid calcium hypochlorite.

7. The manufacture of calcium hypochlorite products substantially free from calcium chloride which includes the steps of treating a solution containing calcium hypochlorite and calcium chloride with an alkali metal salt, the calcium salt of which is sparingly soluble, in an amount chemically equivalent to the chloride present, removing the precipitated calcium salt, evaporating the solution to isolate solid calcium hypochlorite, removing said calcium hypochlorite from the solution and continuing the evaporation of the solution to isolate a mixture of solid calcium hypochlorite and alkali metal chloride.

JOSEPH A. M. W. MITCHELL.
FRANCIS T. MEEHAN.